United States Patent
Hinrichs et al.

(10) Patent No.: US 12,422,049 B2
(45) Date of Patent: Sep. 23, 2025

(54) DEVICE FOR REGULATING A FLOW AND DISTRIBUTING A FLUID CIRCUIT AS WELL AS A CONVEYING UNIT WITH THE DEVICE

(71) Applicant: HANON SYSTEMS EFP DEUTSCHLAND GMBH, Bad Homburg (DE)

(72) Inventors: Jan Hinrichs, Friedrichsdorf (DE); Tilo Schäfer, Daubach (DE)

(73) Assignee: HANON SYSTEMS EFP DEUTSCHLAND GMBH, Bad Homburg V.D. Höhe (DE)

( * ) Notice: Subject to any disclaimer, the term of this patent is extended or adjusted under 35 U.S.C. 154(b) by 46 days.

(21) Appl. No.: 18/248,206

(22) PCT Filed: Nov. 3, 2021

(86) PCT No.: PCT/DE2021/100875
§ 371 (c)(1),
(2) Date: Apr. 6, 2023

(87) PCT Pub. No.: WO2022/117143
PCT Pub. Date: Jun. 9, 2022

(65) Prior Publication Data
US 2023/0392699 A1    Dec. 7, 2023

(30) Foreign Application Priority Data

Dec. 1, 2020  (DE) .................. 10 2020 131 785.9
Aug. 9, 2021  (DE) .................. 10 2021 120 634.0

(51) Int. Cl.
*F16K 11/074*   (2006.01)
*B60H 1/00*     (2006.01)
*F16K 3/08*     (2006.01)

(52) U.S. Cl.
CPC ........ *F16K 11/074* (2013.01); *B60H 1/00485* (2013.01); *F16K 3/08* (2013.01)

(58) Field of Classification Search
CPC ...... F16K 11/072; F16K 11/074; F16K 11/08; F16K 11/085; F16K 3/08; F16K 3/085;
(Continued)

(56) References Cited

U.S. PATENT DOCUMENTS 1,738,135 A * 12/1929 Bannister ................ F16K 3/085
                                                     251/180
3,812,882 A *  5/1974 Taylor ................. F16K 37/0016
                                                     251/304
(Continued)

FOREIGN PATENT DOCUMENTS

CN    104061343 A  *  9/2014  ............ F16K 11/074
CN    111350840 A      6/2020
(Continued)

OTHER PUBLICATIONS

Machine English translation of CN104061343 (Year: 2024).*
Machine English translation of DE20316356 (Year: 2024).*

*Primary Examiner* — Hailey K. Do
(74) *Attorney, Agent, or Firm* — Shumaker, Loop & Kendrick, LLP; James D. Miller (57) ABSTRACT

A device for regulating a flow and distributing a fluid in a fluid circuit. The device has a housing with port elements and at least two disc elements, which are each formed with at least one passage opening. The disc elements are arranged at a distance from each other in a direction of a longitudinal axis of the device. A valve body, which has at least one passage opening, is formed between the disc elements. The at least one passage opening of the disc elements and the at least one passage opening of the valve body each are formed with the arrangement of the valve body relative to the disc elements and to the housing to control at least one flow cross (Continued)

section of a flow path through the housing with the port elements and through the disc elements and the valve body.

27 Claims, 6 Drawing Sheets

(58) Field of Classification Search
CPC .... F16K 3/0227; F16K 3/0236; F16K 5/0407; F16K 5/0414; B60H 1/00485; B60K 2001/005; B60K 2001/006; F01P 2050/24
See application file for complete search history.

(56) References Cited

U.S. PATENT DOCUMENTS

| | | | |
|---|---|---|---|
| 4,181,067 A * | 1/1980 | Ortelli | F01L 7/06 91/485 |
| 4,432,387 A * | 2/1984 | Sims | F16K 3/085 137/329.02 |
| 5,284,320 A * | 2/1994 | Michael | F16K 3/10 251/304 |
| 5,307,838 A * | 5/1994 | d'Agostino | F16K 11/074 137/865 |
| 2010/0037838 A1* | 2/2010 | Moench | F16K 11/074 137/625.46 |

FOREIGN PATENT DOCUMENTS

| | | | | |
|---|---|---|---|---|
| CN | 111637249 A | | 9/2020 | |
| DE | 20316356 U1 | * | 1/2004 | ........... F16K 11/074 |
| DE | 102010064338 A1 | | 7/2012 | |
| DE | 102012022211 A1 | | 5/2014 | |
| DE | 102018106298 A1 | | 9/2019 | |
| EP | 0246359 A2 | | 11/1987 | |
| EP | 0277584 A2 | | 8/1988 | |
| EP | 3369972 A1 | | 9/2018 | |
| GB | 2310707 A | * | 9/1997 | ........... F16K 27/045 |
| JP | 2013053724 A | | 3/2013 | |
| KR | 102115927 B1 | | 5/2020 | |
| NL | 0227170 A1 | * | 7/1987 | |

* cited by examiner

DEVICE FOR REGULATING A FLOW AND DISTRIBUTING A FLUID CIRCUIT AS WELL AS A CONVEYING UNIT WITH THE DEVICE

CROSS REFERENCE TO RELATED PATENT APPLICATIONS

This is a U.S. national phase patent application of PCT/DE2021/100875 filed Nov. 3, 2021 which claims the benefit of and priority to German Patent Application No. 10 2021 120 634.0 filed on Aug. 9, 2021 and German Patent Application No. 10 2020 131 785.9 filed on Dec. 1, 2020, the entire contents of each of which are incorporated herein by reference.

FIELD

The invention relates to a device for regulating a flow and distributing a fluid in a fluid circuit, in particular a coolant in a coolant circuit. The device has a housing with port elements for connecting the device to fluid lines as well as at least two disc elements disposed within a volume enclosed by the housing, each having at least one passage opening.

BACKGROUND

In passenger motor vehicles known from prior art, a high demand on the comfort of the passengers in the passenger compartment is met by air-conditioning systems with different circuits for refrigerant and coolant, each with differently operated heat exchangers.

Conventional motor vehicles with electric motor drive, referred to in short as electric vehicles, or motor vehicles with a hybrid drive consisting of an electric motor and an internal combustion engine, referred to in short as hybrid vehicles, also have a higher cooling requirement than motor vehicles with a pure internal combustion motor drive because of their design with additional components of the electric drive train, such as a high-voltage battery, an internal charger, a transformer, an inverter as well as the electric motor. In addition to the refrigerant circuit of the actual air-conditioning system, known motor vehicles are designed with a purely electric drive or an electric hybrid drive with a coolant circuit in which the coolant circulating for discharging the heat emitted by the drive components is conducted, for example, through an air-cooled heat exchanger. In particular, the vehicles mentioned are to be designed with a possibility of rapid charging of the electric energy storages, such as the high-voltage battery of the drive train, as an increased requirement for cooling the energy storages.

Thermal systems of electrically driven motor vehicles have a considerable impact on the range of the motor vehicles due to the required energy demand for operation. For example, a more rapid conditioning of components which require an optimum operating temperature is enabled by a demand-oriented distribution of heat flows in the motor vehicle with various subsystems. In battery-electrically operated motor vehicles and motor vehicles with hybrid drive, in which, in addition to the conditioning of the passenger compartment, for example, the conditioning of the high-voltage components of the electric drive train are of particular interest, the impact of the operation of the thermal systems on the range of the motor vehicle is to be minimized.

It is known from prior art to design refrigerant circuits of air-conditioning systems that are operable both in a mode as a heat pump and in a mode as a refrigeration system in order to distribute thermal energy within the motor vehicle. For example, heat, which is then transmitted to components of the motor vehicle with heat demand, can be absorbed from the ambient air, particularly during operation of the refrigerant circuit in the heat pump mode. During operation of the refrigerant circuit in the refrigeration system mode, heat can be absorbed from the passenger compartment or from the supply air to the passenger compartment or other components and transmitted to the environment. Here, thermal carrier circuits, such as refrigerant circuits and coolant circuits, are connected to each other and to further components of the motor vehicle within the thermal systems. For this purpose, specially hybrid-driven motor vehicles will require a substantial redesign in order to be able to arrange the thermal system for conditioning various components in the existing installation space.

Figure 1:
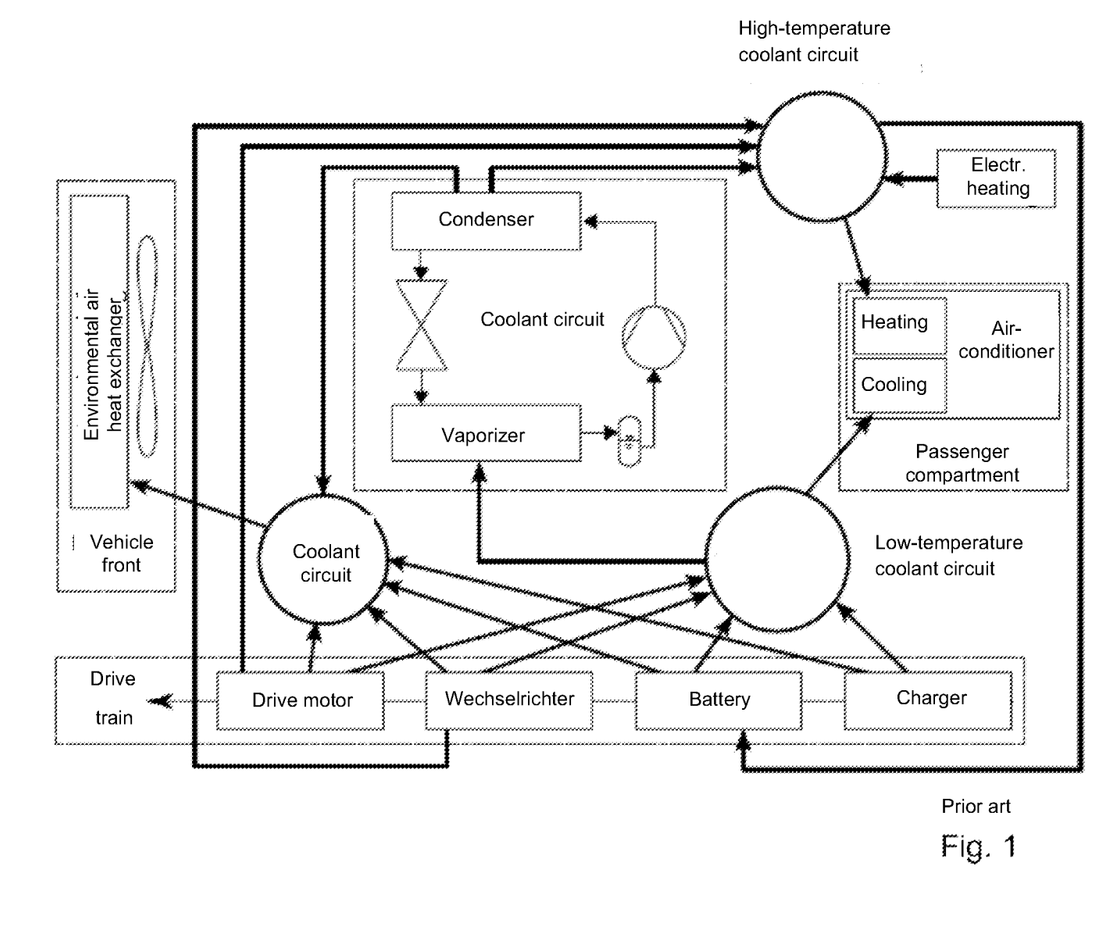
FIG. 1: a thermal system with a refrigerant circuit and three coolant circuits of a motor vehicle from prior art.

In FIG. 1, a thermal system with a refrigerant circuit and three coolant circuits of a motor vehicle from prior art is shown. The coolant circuits and the refrigerant circuit are thermally coupled to each other via heat exchangers. The coolant circuits can be supplied by different coolants or by one coolant and are designed with different valves in order to allow the coolant to flow in and between the coolant circuits and the corresponding components.

The design of the thermal system shows a high degree of complexity, in particular in the interconnection of the circuits, particularly the coolant circuits. The use of simple coolant valves known from prior art would require a very large number of valves and lines.

US 2017 0373359 A1 discloses a heat management system for a motor vehicle with an integrated coolant container arrangement with a container for storing or for passing a liquid medium. The container has different ports for connecting to different components, such as a pump or a multi-way valve.

DE 10 2012 022 211 A1 discloses a multi-way regulating valve designed as a disc valve. The valve has a housing with ports for a liquid or gaseous medium as well as a valve disc supported rotatably in the housing, in particular made of ceramic, which is designed with at least one first throughflow opening in order to connect the ports of the housing to each other or to separate them from each other fluidly as a function of a rotational position. The valve disc rests at least planarly on a sealing disc, in particular made of ceramic, which is fixed against rotation and has at least two second throughflow openings. An elastically deformable and disc-shaped sealing element arranged between the sealing disc and an intermediate bottom of the housing has third throughflow openings aligned with the second throughflow openings.

DE 10 2010 064 338 A1 describes a valve for controlling volumetric flows of a coolant in a heating and/or cooling system of a motor vehicle having a housing with at least one inlet channel and at least one outlet channel. A valve disc which is rotatable about an axis of a shaft is arranged in the housing and has an impact on a connection between the inlet channel and the outlet channel.

The valves known from prior art are characterized in that with usually four ports, conventionally two to three ports and flow channels on a remote side of an actuating element and no or at most one port and flow channel on the actuating side, no sufficient number of ports is provided. In addition, the flow channels are formed jointly within a circular cross section so that only a proportional cross section area, for example in the shape of a pie piece, is available in each case and the flow cross section is so very limited. Increasing the circular flow cross section with a larger diameter increases the space requirement and results in an increase of the operating forces or actuating forces.

The object of the invention is to provide and further develop a device for regulating a flow and distributing a fluid in a fluid circuit, in particular in coolant circuits of a thermal system of a motor vehicle. A maximum number of heat sources and heat sinks of the thermal system, particularly of a battery-electrically driven or hybrid-driven motor vehicle, are to be connected to each other on the coolant side with a minimum number of components. The manufacturing, maintenance and operating costs as well as the required installation space of the device should be minimal. The thermal system should be operable with maximum efficiency.

SUMMARY

The object is achieved by the items with the features as shown and described herein.

The object is achieved by a device for regulating a flow and distributing a fluid in at least one fluid circuit, in particular a coolant in at least one coolant circuit. The device has a housing with port elements for connecting the device to fluid lines as well as at least two disc elements disposed within a volume enclosed by the housing and aligned parallel to each other. The disc elements are each formed with at least one passage opening. Each port element encloses a flow channel for inflowing or outflowing of the fluid. Each flow channel formed by a port element leads into the volume enclosed by the housing.

According to the design of the invention, the disc elements are arranged at a distance from each other in a direction of a longitudinal axis of the device. In addition, a valve body supported rotatably relative to the housing about a rotation axis oriented in the direction of the longitudinal axis is provided in the direction of the longitudinal axis between the disc elements. The valve body has at least one passage opening. The at least one passage opening of the disc elements and the at least one passage opening of the valve body each are formed with the arrangement of the valve body relative to the disc elements and to the housing to control at least one flow cross section of a flow path through the housing with the port elements and through the disc elements and the valve body.

The disc elements, which are preferably each immovably and rigidly connected to the housing, advantageously have a constant wall thickness in the direction of the longitudinal axis of the device.

According to a further development of the invention, the disc elements are formed in the shape of a circular cylinder. The axis of the circular cylinder is aligned in the direction of the longitudinal axis of the device.

The disc elements are preferably arranged each on an end face of the volume enclosed by the housing. The disc elements each can be sealed at end faces facing away from each other with at least one sealing element each towards the housing. In addition to sealing the disc elements towards the housing, the sealing elements also advantageously serve to clamp the disc elements in connection with the valve body against the housing or against the valve body in the direction of the longitudinal axis in order to ensure both the fixed and immovable connection to the housing and a sealing towards the valve body.

According to a preferred embodiment of the invention, the valve body is arranged between mutually facing end faces of the disc elements. The surfaces of the mutually facing end faces of the disc elements and of the valve body correspond to each other and abut each another in a fluid-tight manner.

A further advantage of the invention is that the volume enclosed by the housing essentially has a circular-cylindrical shape. An inner circumferential surface of the housing corresponds in each case to an outer circumferential surface of the disc elements, and the outer diameter of the disc elements corresponds in each case to the inner diameter of the circumferential surface of the housing plus a clearance for mounting.

The valve body preferably has a shape of a circular cylinder. An outer circumferential surface of the valve body has a smaller diameter than the inner circumferential surface of the housing, and the disc elements and the valve body are arranged coaxially to each other and towards the volume enclosed by the housing, so that a flow path in the shape of a uniform annular gap is formed between the outer circumferential surface of the valve body and the inner circumferential surface of the housing. The flow path is advantageously formed to extend completely around the valve body and has a constant width in the radial direction and a constant height over the entire circumference in the direction of the longitudinal axis of the device.

The flow path is preferably connected to a flow channel, which is oriented in the radial direction and formed by a port element, for inflow or outflow of the fluid.

According to an advantageous embodiment of the invention, in the case of a design of the disc elements each having at least two passage openings, the passage openings have different, specifically shaped flow cross sections in particular in the shape of a circular sector or a circular section as partial surface of a circular area which is bounded by an arc of a circle and two radii of a circle.

The disc elements can be formed of a ceramic or a metal or a plastic material, while the valve body can be formed of a plastic material or a metal, in particular as a powder metal part.

According to a further development of the invention, the valve body is connected to a drive element via a connecting element. The connecting element may be formed as a shaft, the rotation axis of which is arranged coinciding with the rotation axis of the valve body and the longitudinal axis of the device.

According to a further advantage of the invention, the connecting element is fixedly connected to the drive element at a first end, and is connected at a second end formed distally to the first end and projecting into the housing, and is connected to the valve body in a connecting area.

The connecting area in the valve body is preferably formed as an opening extending at least partially into the valve body or completely through the valve body in the direction of the longitudinal axis of the device.

The connecting element is preferably arranged with the second end engaging in the opening formed in the valve body. An inner surface of the opening and an outer surface of the connecting element can be formed to interlock with each other, in particular as a square connection, a multi-tooth connection, a multi-round connection and/or connected with a feather key. According to an alternative embodiment, the valve body is injection molded onto the connecting element as an injection-molded element.

The connecting element is advantageously disposed to be supported in at least one disc element and can also be arranged as being supported in both disc elements.

The drive element is preferably designed as an electric servomotor, in particular as a stepper motor.

According to a further preferred embodiment of the invention, at least one first passage opening of the valve body is formed so as to extend completely through the valve body from a first end face to a second end face and to be closed on the circumferential surface, while at least one second passage opening of the valve body is preferably formed so as to lead exclusively into one end face of the valve body and to be open at the circumferential surface of the valve body.

A further advantage of the invention is that the housing is formed in two parts with a supporting element and a cover element limiting the volume enclosed by the housing.

The object is also achieved by a conveying unit for conveying a fluid in at least one fluid circuit, in particular a coolant in at least one coolant circuit, with at least two conveying devices. The conveying unit is formed with a device according to the invention for regulating the flow and for distributing the fluid in the fluid circuit.

According to a further development of the invention, two conveying devices arranged adjacent to each other, for example pumps, are configured so that the drive directions of the conveying devices are oriented in opposite directions, in particular in opposite directions to each other.

The advantageous design of the invention enables the use of the device for regulating a flow and distributing a fluid in a coolant circuit of a thermal system, in particular a thermal management system, of a motor vehicle for conditioning at least one air mass flow to be supplied to a passenger compartment and at least one component of a drive train. The thermal system has at least one refrigerant circuit and the at least one coolant circuit also for receiving heat from the refrigerant circuit. The device then serves as an adaptive multi-path coolant valve for vehicle air-conditioning.

The device according to the invention for regulating a flow and distributing a fluid, for example a coolant in a coolant circuit, enables a large variability with respect to the ports and switching positions, particularly as a highly variable coolant valve with a plurality of possible throughflow paths and a specific construction. Thus, up to seven ports can be formed and four main positions and intermediate positions can be represented. For carrying out all functions, only a single drive element is required so that no duplications, for example of the drive motor, the electronics and the cable guide, are necessary.

With respect to the conveying unit, the components of the coolant circuit in the battery-electrically operated motor vehicle can be combined.

In summary, the device according to the invention has further various advantages:
- a maximum number of heat sources and heat sinks of the thermal system, particularly of a battery-electrically driven or hybrid-driven motor vehicle, can be connected to each other on the coolant side with a minimum number of components,
- depending on requirements, coolant may be available at different temperature levels for different components,
- maximum efficiency when operating the thermal system, and
- minimum manufacturing, maintenance and operating costs as well as minimum required installation space.

DESCRIPTION OF DRAWINGS

Further details, features and advantages of embodiments of the invention will become apparent from the following description of embodiments with reference to the associated drawings. The figures show as follows.

DESCRIPTION OF AN EMBODIMENT

Figure 2A:
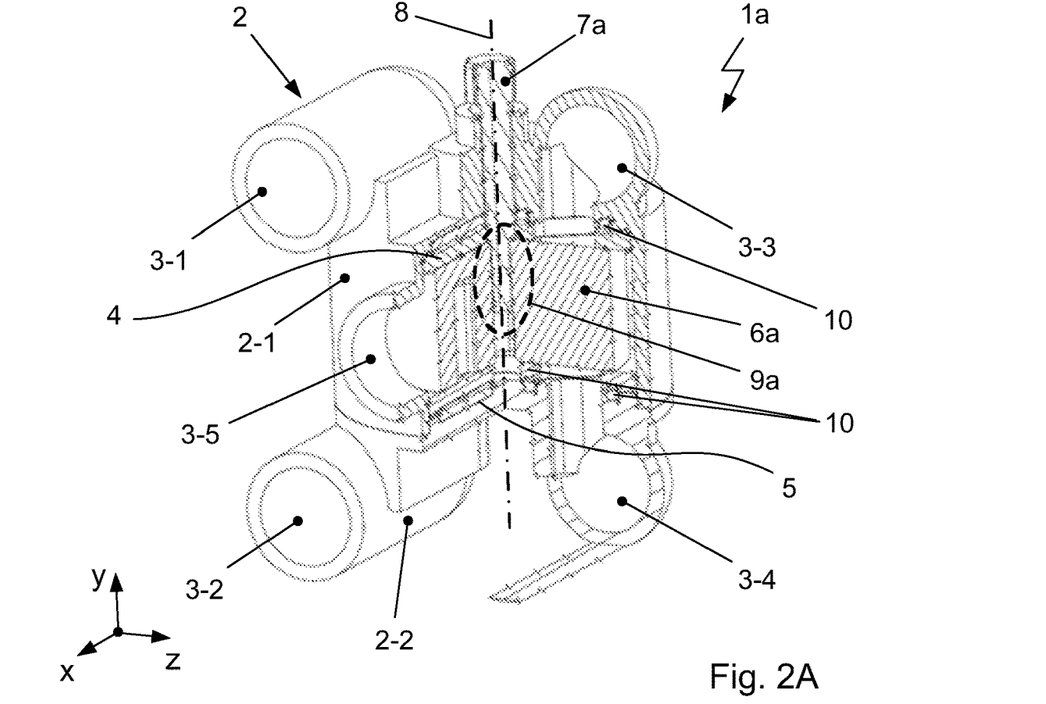
FIG. 2A: a first embodiment of a device for regulating a flow and distributing at least one fluid in at least one fluid circuit, in particular in coolant circuits of a thermal system of a motor vehicle, in a partial sectional view.
Figure 2B:
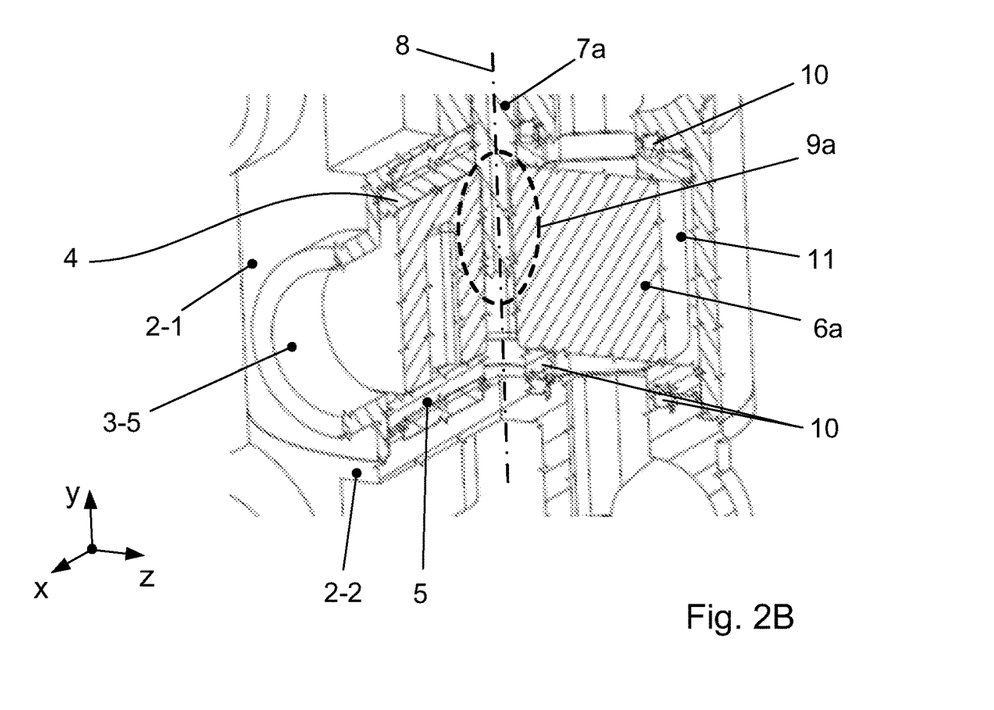
FIG. 2B: the device of FIG. 2A in a detailed view.
Figure 2C:
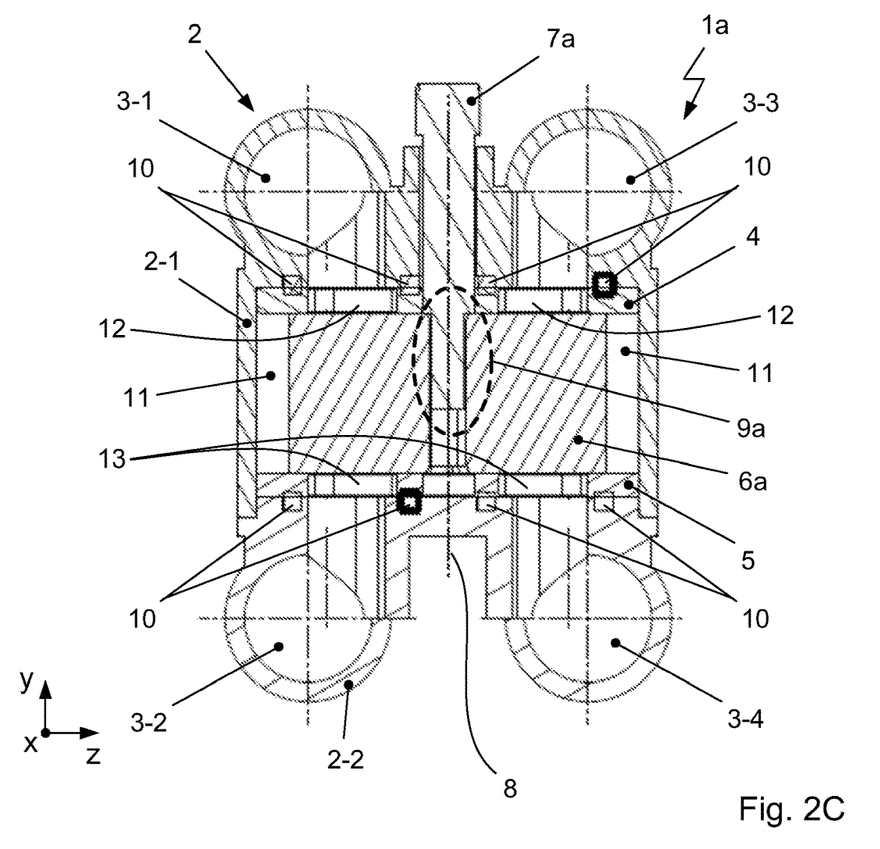
FIGS. 2C and 2D: the device of FIG. 2A in a sectional view of a frontal view and a top view.
Figure 2D:
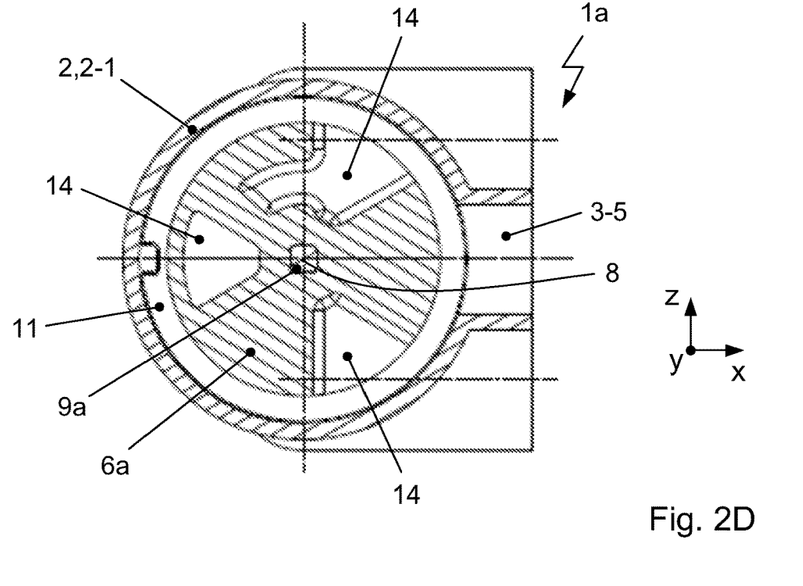
Figure 3A:
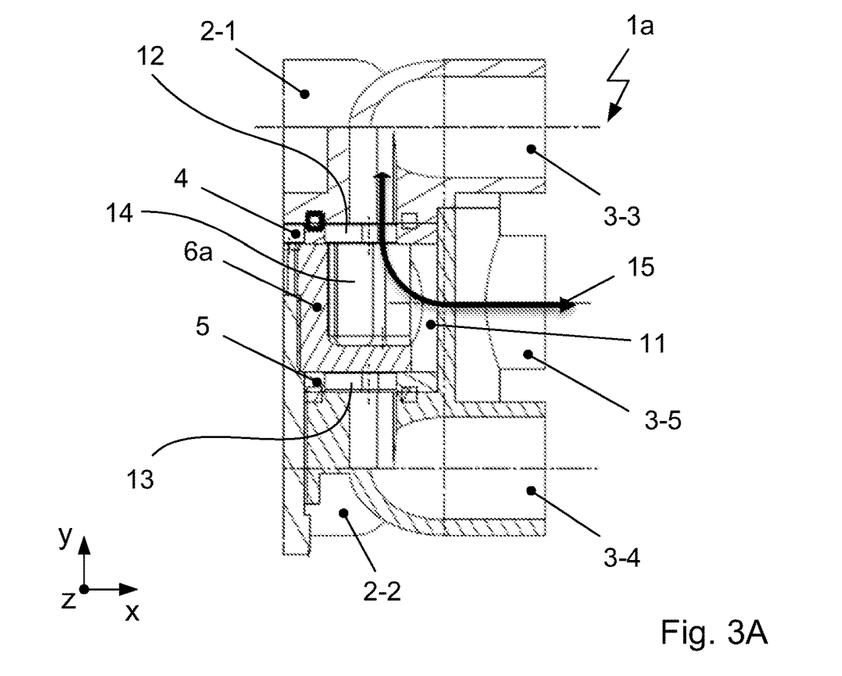
FIGS. 3A and 3B: the device of FIG. 2A in a respective sectional view of a side view with different open flow paths.
Figure 3B:
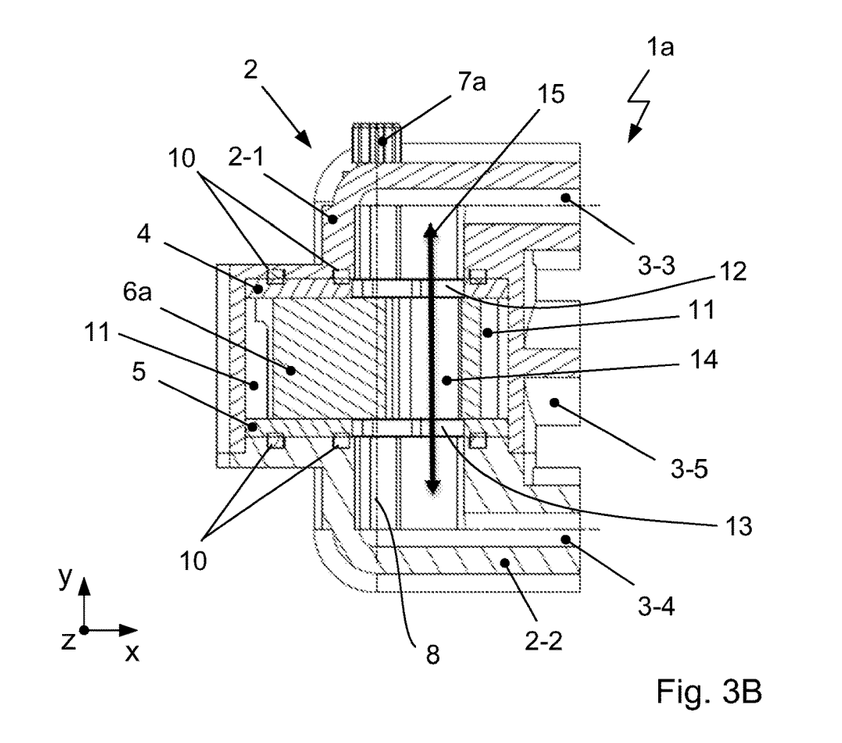
Figure 3C:
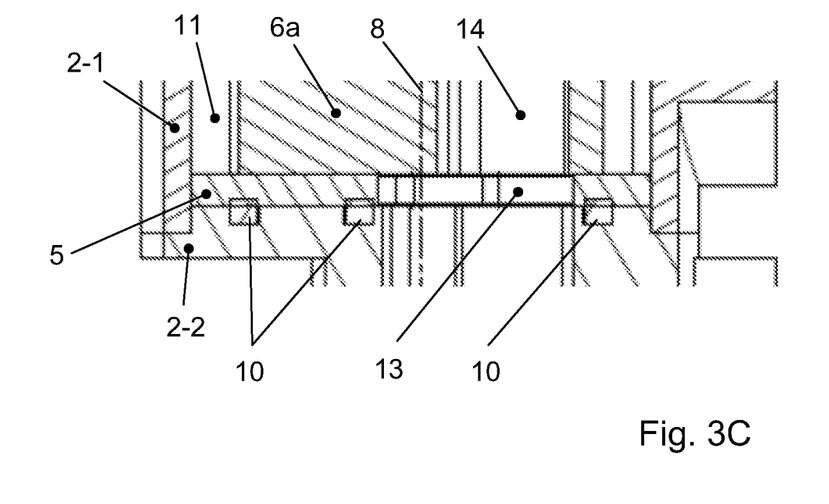
FIG. 3C: a detailed view of the representation of FIG. 3B, FIGS. 4A and 4B: a rotatable disc element as valve body of the device of FIG. 2A in a lateral sectional view as well as a perspective view.

FIGS. 2A to 2D each show a first embodiment of a device 1a for regulating a flow and distributing at least one fluid in at least one fluid circuit, in particular in coolant circuits of a thermal system of a motor vehicle. The device 1a is shown in a partial sectional view in FIG. 2A with a detailed view in FIG. 2B, while the device 1a is shown in a sectional view of a frontal view in FIG. 2C and in a sectional view of a top view in FIG. 2D. FIGS. 3A and 3B show the device 1a of FIG. 2A in a respective sectional view of a side view with different open flow paths for the fluid. FIG. 3C shows a detailed view of the representation of the device 1a of FIG. 3B.

The device 1a has a two-part housing 2 formed of a supporting element 2-1 and a cover element 2-2, and a connecting element 7a. In the closed state of the housing 2, the supporting element 2-1 and the cover element 2-2 limit a volume in which further components of the device 1a are arranged. The components are arranged primarily within the supporting element 2-1. The cover element 2-2 serves for closing the housing 2.

The housing 2 is formed with port elements 3-1, 3-2, 3-3, 3-4, 3-5 pointing in a common direction x for connection to connecting lines of the at least one fluid circuit. Intersections of axes of symmetry of four port elements 3-1, 3-2, 3-3, 3-4 with a plane extending perpendicularly to the direction x through the directions y and z form a rectangle, in particular a square. A fifth port element 3-5 is arranged at the center of the rectangle, i.e., at the intersection of the diagonals of the rectangle. Three port elements 3-1, 3-3, 3-5 are provided on the supporting element 2-1 of the housing 2 and two port elements 3-2, 3-4 are provided on the cover element 2-2 of the housing 2.

The outer shape of the housing 2 can be designed in such a way that the functions, for example also a concrete arrangement within a system, are ensured and that series production is possible as cost-efficient as possible with a minimum component weight.

Within the volume enclosed by the housing 2, a first disc element 4 and a second disc element 5, which are immovably or fixedly connected to the housing 2, are provided. The stationary disc elements 4, 5, also referred to as static elements, are arranged uniformly spaced from each other in the direction y. The uniform distance between the first disc element 4 and the second disc element 5 results from the respective disc-shaped configuration with an essentially constant wall thickness of the disc elements 4, 5 and a parallel alignment of the disc elements 4, 5 in each case in a plane spanned by the directions x and z.

The first disc element 4 is sealed on an upper side in the direction y with sealing elements 10 towards the housing 2, in particular towards the supporting element 2-1, while the second disc element 5 is sealed on a bottom side in the direction y likewise with sealing elements 10 towards the housing 2, in particular towards the cover element 2-2. The preferably annular sealing elements 10 are each arranged between the disc element 4, 5 and the housing 2 and, in addition to sealing, also serve to bias the disc elements 4, 5 in the arrangement within the housing 2, which, for example, prevents rotation of the disc elements 4, 5 about a rotation axis 8 of the device 1a. The sealing elements 10 can be formed as molded seals with sufficient thickness or height, in particular of at least 2 mm, in order to have a spring characteristic curve which is as linear, predetermined and easily adjustable as possible.

The disc elements 4, 5 each can be sealed to the housing 2 by a plurality of, in particular in each case two, sealing elements 10, or alternatively by means of a single molded seal per disc element 4, 5, and can be biased together with a valve body 6a. The sealing elements 10 are preferably formed as elastomer seals or molded rubber parts.

Within the distance extending in the direction y between the first disc element 4 and the second disc element 5, the valve body 6a is arranged as a third disc element. The valve body 6a is consequently enclosed in the direction y both by the first disc element 4 and by the second disc element 5. The disc elements 4, 5 are each preferably formed of a ceramic, a metal or a plastic material.

The first disc element 4 and the second disc element 5 together with the valve body 6a as a third disc element form a kind of sandwich arrangement in which the valve body 6a is covered on both sides by the disc elements 4, 5. While the first disc element 4 and the second disc element 5 are arranged statically, in particular in relation to the housing 2, the valve body 6a is supported rotatably about the rotation axis 8 oriented in the direction y by a drive element via the connecting element 7a in relation to the housing 2 and to the disc elements 4, 5. The valve body 6a can be formed of a plastic material or a metal, in particular as a powder metal part.

The surfaces of the disc elements 4, 5 and of the disc-shaped valve body 6a, which are arranged facing each other, are shaped uniformly and corresponding to each other, preferably ground and polished, so that the abutting surfaces each form a sufficiently fluid-tight sealing structure which is impermeable to the fluid, particularly to a coolant.

The drive element, for example an electric drive, is connected to the valve body 6a via the connecting element 7a formed as a shaft for driving and moving the valve body 6a about the rotation axis 8. The longitudinal axis of the connecting element 7a and the rotation axis 8 are aligned coaxially with each other.

The connecting element 7a is fixedly connected at a first end to the drive element, which can be designed as a stepper motor. With the second end formed distally to the first end, the connecting element 7a is arranged projecting through an opening into the housing 2 and is connected to the valve body 6a.

The connecting element 7a and the valve body 6a are coupled to each other in a connecting area 9a via a shaft-hub connection. Here, the connecting element 7a engages with the second end in an opening formed in the valve body 6a. The shaft-hub connection is designed, for example, as a square connection, a multi-tooth connection or a multi-round connection minimized in terms of rotational play, with which the torque is transmitted from the connecting element 7a to the valve body 6a. The connecting area 9a is consequently configured for transmitting a torque from the connecting element 7a to the valve body 6a.

The opening formed in the valve body 6a has a rectangular, in particular square, cross section which corresponds to the square cross section of the connecting element 7a within the connecting area 9a. The connecting element 7a is supported on one side inside the first disc element 4.

The volume enclosed by the housing 2, in which the disc elements 4, 5 and the valve body 6a, which is supported rotatably between the disc elements 4, 5, are arranged, substantially has a shape of a circular cylinder. The inner circumferential surface of the volume corresponds in each case to an outer circumferential surface of the disc elements 4, 5 having a shape of a circular cylinder. The outer diameter of the disc elements 4, 5 corresponds in each case to the inner diameter of the wall of the housing 2 delimiting the circular-cylindrical volume, plus a small clearance for mounting the device 1a.

The outer circumferential surface of the circular-cylindrical valve body 6a has a smaller diameter than the inner circumferential surface of the wall of the housing 2 defining the circular-cylindrical volume. Since the disc elements 4, 5 and the valve body 6a are arranged coaxially with respect to each other and with respect to the circular-cylindrical volume, and thus on a common axis, in particular the rotation axis 8 of the connecting element 7a and the valve body 6a, a flow path 11 in the shape of a uniform annular gap is formed between the outer circumferential surface of the valve body 6a and the corresponding wall of the housing 2. The annular gap or annular space is uniformly encircling the outer circumferential surface of the valve body 6a and has a constant width in radial direction and a constant height in direction y over the entire circumference. The flow path 11 is delimited by the disc elements 4, 5 in direction y and thus at the end faces. The flow path 11 is closed in its entirety at the end faces. In addition, the flow path 11 is connected to a flow channel, which is oriented in the radial direction and formed by the port element 3-5, for inflow or outflow of the fluid.

The volume formed rotational-symmetrically about the rotation axis 8 aligned in the longitudinal direction y and enclosed by the housing 2 is also connected to the port elements 3-1, 3-2, 3-3, 3-4, which are in each case designed as rotational-symmetrical connectors and which in each case shape a flow channel for inflow or outflow of the fluid. The flow channels formed by the two port elements 3-1, 3-3 lead into the volume enclosed by the housing 2 at a first end face, while the flow channels formed by the two port elements 3-2, 3-4 lead into the volume enclosed by the housing 2 at a second end face. The first disc element 4 is arranged on the first end face of the volume enclosed by the housing 2, while the second disc element 5 is arranged on the second end face.

The volume enclosed by the housing 2 is connectable in each case to the flow channels of the port elements 3-1, 3-2, 3-3, 3-4 via passage openings 12, 13 formed in the disc elements 4, 5. The passage openings 12, 13 have different, specifically shaped flow cross sections, for example in the shape of a circular sector or a circular section as partial surface of a circular area which is bounded by an arc of a circle and two radii of a circle.

Depending on the position of the valve body 6a supported rotatably about the rotation axis 8, the passage openings 12, 13 of the disc elements 4, 5 correspond in each case with passage openings 14 formed in the valve body 6a. The passage openings 12, 13, 14 are each oriented essentially in the direction of the axis rotation axis 8, which also corresponds to the longitudinal axis of the device 1a. By means of the rotating movement of the valve body 6a about the rotation axis 8 and thus the movement of the valve body 6a relative to the disc elements 4, 5 and the housing 2, the flow cross sections of the passage openings 12, 13, 14 are arranged overlapping each other completely or at least in areas and are thereby connected to each other. The passage openings 12, 13, 14 in common cooperation connect a certain combination of the flow channels formed by the port elements 3-1, 3-2, 3-3, 3-4, 3-5 or separate certain flow channels from each other in order to guide the fluid selectively through the device 1a, in particular between the port elements 3-1, 3-2, 3-3, 3-4, 3-5. Number, arrangement and alignment of the port elements 3-1, 3-2, 3-3, 3-4, 3-5 of the housing 2 can vary depending on the needs.

The manufacturing tolerances of the individual components of the device 1a are selected so that the fluid, in particular the coolant, can flow only through the passage openings 12, 13, 14 of the disc elements 4, 5, 6a and undesired bypass flows between the circumferential surfaces or end faces of the disc elements 4, 5, 6a or the housing 2 are avoided. The housing 2 and the disc elements 4, 5 are sealed to each other by the additional sealing elements 10 in order to prevent internal leakages.

With the targeted arrangement of the passage openings 12, 13, 14 of the disc elements 4, 5, 6a relative to each other, throughflow openings between the port elements 3-1, 3-2, 3-3, 3-4, 3-5 can be blocked or released.

Particularly with the movement of the valve body 6a arranged between the disc elements 4, 5 about the rotation axis 8, several different fluid guides are enabled, in particular also activating or opening of more than three flow channels of the port elements 3-1, 3-2, 3-3, 3-4, 3-5. The flow of the fluid through the valve body 6a is possible both in the axial and in the radial direction. In addition, the annular gap-shaped flow path 11, in particular according to FIG. 2D, is connected to at least one of the passage openings 14 of the valve body 6a extending in the axial direction y so that the flow path 11 can also be connected to the passage openings 12, 13 of the disc elements 4, 5 and in this way the fluid flows can be deflected in different directions.

Thus, FIG. 3A shows a reversal of the flow direction 15 of the fluid from an axial direction to a radial direction with open and interconnected flow channels of the port elements 3-3, 3-5 and vice versa, while FIG. 3B shows a purely axial flow direction 15 of the fluid between the open and interconnected flow channels of the port elements 3-3, 3-4.

With a certain number of passage openings 12, 13, 14 in combination with a specific arrangement of the passage openings 12, 13, 14 it is possible to determine which different throughflows through the device 1a are to be ensured. The design and the arrangement of the valve body 6a in connection with the disc elements 4, 5 within the device 1a allow for certain passage openings 12, 13, 14 to be arranged at certain setting angles of the valve body 6a relative to each other so that certain throughflow openings are free or blocked and the fluid is guided from one or more port elements 3-1, 3-2, 3-3, 3-4, 3-5 to one of the several other port elements 3-1, 3-2, 3-3, 3-4, 3-5.

This provides a plurality of different switching scenarios of the device 1a which are dependent on the respective operating mode of the thermal system.

Figure 4A:
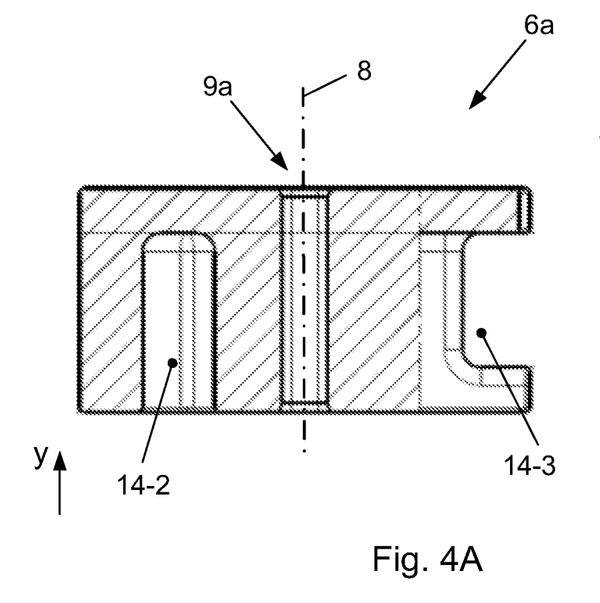
Figure 4B:
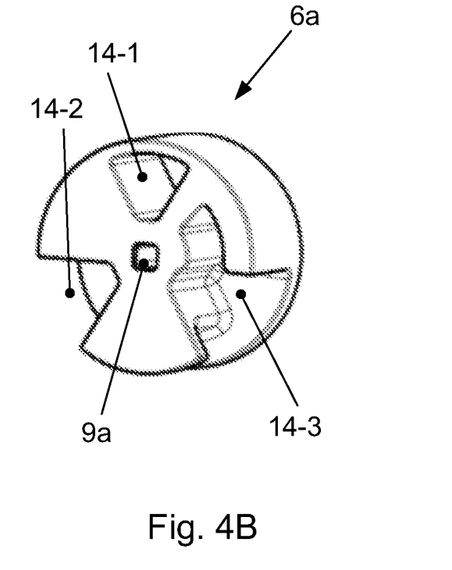

FIGS. 4A and 4B represent the third disc element 6a, which is rotatable about the rotation axis 8, as valve body 6a of the first embodiment of the device 1a of FIG. 2A in a lateral sectional view and in a perspective view. In particular, FIG. 2D shows the valve body 6a arranged within the housing 2 already in a sectional view of a top view.

The connecting area 9a of the shaft-hub connection of the valve body 6a to the connecting element 7a is formed in the center of the valve body 6a as an opening extending in the axial direction completely through the valve body 6a. The opening has, for example, a substantially rectangular cross section, particularly a square cross section, for receiving the connecting element 7a. The connecting element 7a is likewise formed in the connecting area 9a with a cross section corresponding to the cross section of the opening of the valve body 6a in order to transmit the torque from the shaft to the valve body 6a.

The passage openings 14-1, 14-2, 14-3 of the valve body 6a for passage and deflection of the fluid flowing through the device 1a have different cross sections, shapes and extensions. Thus, a first passage opening 14-1 extends from the first end face to the second end face completely through the valve body 6a and is closed at the circumferential surface, while a second passage opening 14-2 and a third passage opening 14-3 lead only into one end face of the valve body 6a and are open at the circumferential surface of the valve body 6a in comparison with the first passage opening 14-1. In addition, the first passage opening 14-1 and the second passage opening 14-2 have a cross section in the shape of a circular sector or circular section in the plane perpendicular to the rotation axis 8 as a partial surface of a circular area which is bounded by an arc of a circle and two radii of a circle. The third passage opening 14-3 is formed with a varying cross section in the direction y of the rotation axis 8.

The valve body 6a is formed from a material with high dimensional stability and wear resistance, preferably from a polymer, such as a thermoplastic or a high temperature resistant thermoplastic, for example from polyphenylene sulfide, briefly referred to as PPS, or from a thermoset, in particular from phenolic resin, for increased robustness filled with fibers or with minerals, such as calcium carbonate, in short $CaCO_3$, or aluminum oxide, in short $Al2O3$, or sand or ceramic.

In order to ensure adequate wear protection, the valve body 6a can also be produced from an aluminum die-cast with a silicon content greater than 9% by weight or by means of metal powder injection molding.

Figure 5A:
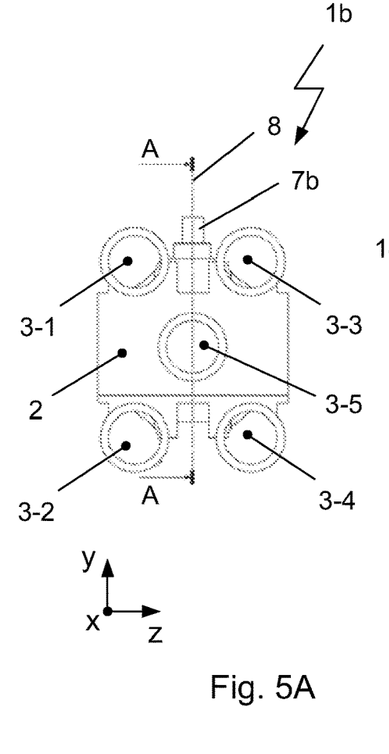
FIGS. 5A and 5B: a second embodiment of a device for regulating a flow and distributing at least one fluid in at least one fluid circuit in a frontal view and in a sectional view of a side view.
Figure 5B:
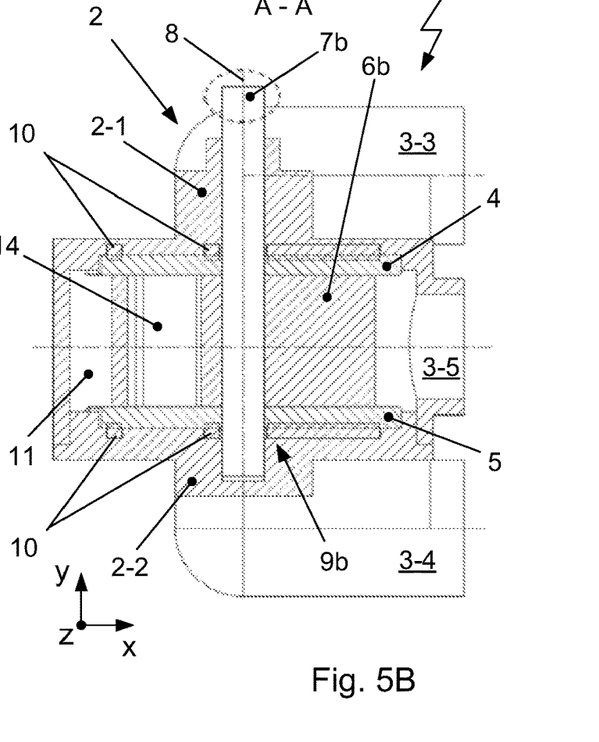

FIGS. 5A and 5B show a second embodiment of the device 1b for regulating the flow and distributing at least one fluid in at least one fluid circuit in a frontal view and in a sectional view of a side view.

The essential difference between the first embodiment of the device 1a, in particular according to FIGS. 2A to 2D, and the second embodiment of the device 1b is in the design of the valve body 6b, in particular the design of the connecting area 9b as a shaft-hub connection with the connecting element 7b. Identical components of the devices 1a, 1b are provided with the same reference numerals.

In contrast to the first embodiment of the device 1a, the connecting element 7b of the second embodiment of the device 1b is supported in both disc elements 4, 5 in order to ensure best possible centering and highest accuracy.

The shaft-hub connection between the connecting element 7b and the valve body 6b is made, for example, with a feather key (not shown). Alternatively, the connecting element 7b could be inserted into a shaping tool and injection-molded with plastic material for shaping the valve body 6b for torque transmission.

At the first end, represented by the dashed circle, for connection to the drive element, the connecting element 7b could also be formed with a cap to reduce the main diameter of the connecting element 7b, which is formed as a shaft, and thus the manufacturing costs.

Figure 6:
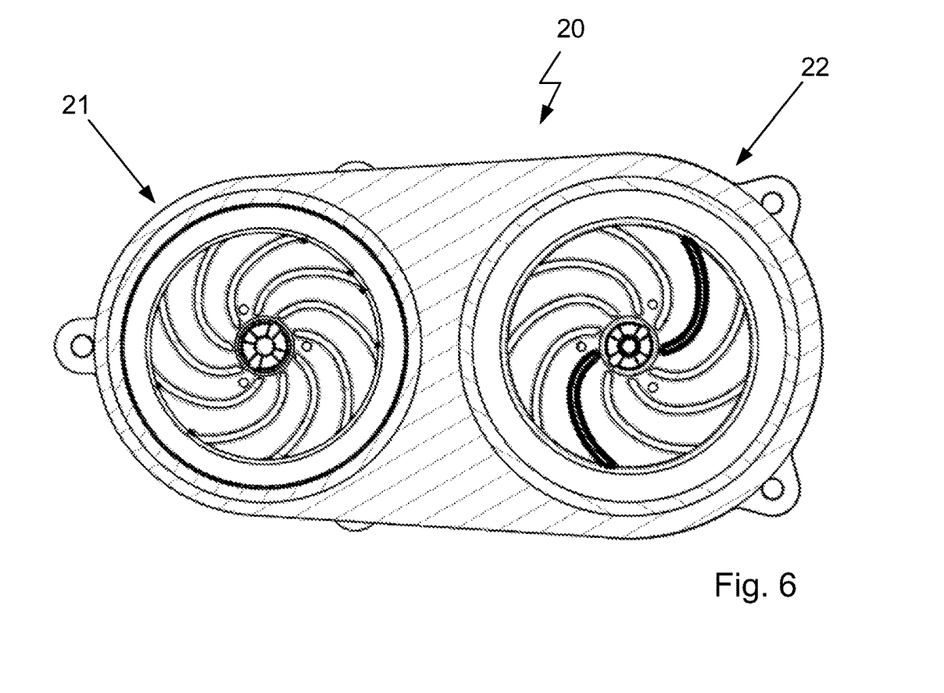
FIG. 6: a conveying unit with two conveying devices for conveying the fluid as well as the device for regulating the flow and for distributing the at least one fluid in the at least one fluid circuit.

FIG. 6 shows a conveying unit 20 with two conveying devices 21, 22 for conveying the fluid as well as the device 1a, 1b (not shown) for regulating the flow and for distributing the at least one fluid in the at least one fluid circuit. The conveying devices 21, 22 are preferably designed as pumps.

The conveying unit 20, with the at least two conveying devices 21, 22 and the device 1a, 1b for regulating the flow and for distributing the fluid in the fluid circuit, has a sufficient number of port elements as well as switching positions and thus flow functions or distribution functions so that complex switching states of mostly electrified vehicle concepts can be imaged with a single device 1a, 1b and consequently with a drive element.

The conveying devices 21, 22 arranged adjacent to each other are rotated in the opposite drive direction so that the reaction moments compensate each other during acceleration and deceleration. The impacts of the accelerated masses are minimized.

LIST OF REFERENCE NUMERALS 1a, 1b device
2 housing
2-1 supporting element
2-2 cover element
3-1 to 3-5 port element
4 first disc element
5 second disc element
6a, 6b valve body, third disc element
7a, 7b connecting element
8 rotation axis
9a, 9b connecting area
10 sealing element
11 flow path
12 passage opening of first disc element 4
13 passage opening of second disc element 5
14 passage opening of valve body 6a, 6b
14-1 first passage opening of valve body 6a
14-2 second passage opening of valve body 6a
14-3 third passage opening of valve body 6a
15 flow direction of fluid
20 conveying unit
21 first conveying unit
22 second conveying unit
x, y, z direction

The invention claimed is:

1. A device for regulating a flow and distributing a fluid in at least one fluid circuit, the device comprising a housing with port elements for connecting to fluid lines as well as at least two disc elements disposed within a volume enclosed by the housing and aligned in parallel to each other, each of the at least two disc elements is formed with at least one passage opening, wherein a respective flow channel formed by each of the port elements leads into the volume, wherein the at least two disc elements are disposed to be spaced apart from each other in a direction of a longitudinal axis of the device, wherein a valve body supported rotatably relative to the housing about a rotation axis aligned in the direction of the longitudinal axis is formed between the at least two disc elements, the valve body has at least one passage opening, wherein a respective one of the at least one passage opening of the at least two disc elements and the at least one passage opening of the valve body with an arrangement of the valve body relative to the at least two disc elements as well as to the housing are formed to control at least one flow area of a flow path through the housing with the port elements and through the at least two disc elements as well as the valve body, wherein the flow path causes an inflow and an outflow of the fluid in both a radial direction and an axial direction, wherein the at least two disc elements each have at least two passage openings, the at least two passage openings have differently shaped flow areas.

2. The device according to claim 1, wherein the at least two disc elements are each immovably connected to the housing.

3. The device according to claim 1, wherein the at least two disc elements have a constant wall thickness in the direction of the longitudinal axis of the device.

4. The device according to claim 1, wherein the at least two disc elements are each disposed at a respective end face of the volume enclosed by the housing.

5. The device according to claim 1, wherein the at least two disc elements are each disposed to be sealed at end faces facing away from each other with at least one sealing element each facing towards the housing.

6. The device according to claim 1, wherein the valve body is disposed between end faces of the at least two disc elements facing each other, wherein surfaces of the end faces of the at least two disc elements facing each other and end faces of the valve body correspond to each other and abut each other in a fluid-tight manner.

7. The device according to claim 1, wherein the at least two disc elements are formed of a ceramic material, a metal or a plastic material.

8. The device according to claim 1, wherein the valve body is formed of a plastic material or of a metal.

9. The device according to claim 1, wherein at least one first passage opening of the valve body is formed to extend completely through the valve body from a first end face to a second end face and to be closed at a circumferential surface.

10. The device according to claim 1, wherein the at least two disc elements are formed in a shape of a circular cylinder, wherein an axis of the circular cylinder is aligned in the direction of the longitudinal axis of the device.

11. The device according to claim 10, wherein the volume enclosed by the housing has a substantially circular-cylindrical shape, wherein each inner circumferential surface of the housing corresponds to an outer circumferential surface of the at least two disc elements and each outer diameter of the at least two disc elements matches an inner diameter of the circumferential surface of the housing plus a clearance for mounting.

12. A conveying unit for conveying a coolant in at least one coolant circuit, with at least two devices of the device for regulating the flow and distributing the fluid in the at least one fluid circuit according to claim 1.

13. The conveying unit according to claim 12, wherein the at least two devices are disposed adjacent to each other and are formed such that drive directions of the conveying devices are aligned opposite to each other.

14. The device according to claim 1, wherein the valve body is formed to be connected to a drive element via a connecting element.

15. The device according to claim 14, wherein the connecting element is formed as a shaft, wherein a rotation axis of the shaft is disposed to coincide with the rotation axis of the valve body and the longitudinal axis of the device.

16. The device according to claim 14, wherein the connecting element is disposed to be supported in at least one of the at least two disc elements.

17. The device according to claim 14, wherein the connecting element is disposed to be supported in all of the at least two disc elements.

18. The device according to claim 14, wherein the drive element is formed as a servomotor.

19. The device according to claim 14, wherein the connecting element is disposed to be rigidly connected to the drive element at a first end and to protrude into the housing at a second end formed distally from the first end as well as to be connected to the valve body in a connecting area.

20. The device according to claim 19, wherein the connecting area in the valve body is formed as an opening extending at least partially into the valve body or completely through the valve body in the direction of the longitudinal axis of the device.

21. The device according to claim 20, wherein the connecting element is disposed to engage, by the second end, with the opening formed in the valve body, wherein an inner surface of the opening and an outer surface of the connecting element are formed to interlock with each other.

22. A device for regulating a flow and distributing a fluid in at least one fluid circuit, the device comprising a housing with port elements for connecting to fluid lines as well as at least two disc elements disposed within a volume enclosed by the housing and aligned in parallel to each other, each of the at least two disc elements is formed with at least one passage opening, wherein a respective flow channel formed by each of the port elements leads into the volume, wherein the at least two disc elements are disposed to be spaced apart from each other in a direction of a longitudinal axis of the device, wherein a valve body supported rotatably relative to the housing about a rotation axis aligned in the direction of the longitudinal axis is formed between the at least two disc elements, the valve body has at least one passage opening, wherein a respective one of the at least one passage opening of the at least two disc elements and the at least one passage opening of the valve body with an arrangement of the valve body relative to the at least two disc elements as well as to the housing are formed to control at least one flow area of a flow path through the housing with the port elements and through the at least two disc elements as well as the valve body, wherein the flow path causes an inflow and an outflow of the fluid in both a radial direction and an axial direction, wherein the at least two disc elements are formed in a shape of a circular cylinder, wherein an axis of the circular cylinder is aligned in the direction of the longitudinal axis of the device, wherein the volume enclosed by the housing has a substantially circular-cylindrical shape, wherein each inner circumferential surface of the housing corresponds to an outer circumferential surface of the at least two disc elements and each outer diameter of the at least two disc elements matches an inner diameter of the circumferential surface of the housing plus a clearance for mounting, wherein the valve body is formed in a shape of a circular cylinder, wherein an outer circumferential surface of the valve body has a smaller diameter than the inner circumferential surface of the housing, and the at least two disc elements as well as the valve body are disposed to be coaxial to each other and aligned with the volume enclosed by the housing such that a flow path in a shape of a regular annular gap is formed between the outer circumferential surface of the valve body and the inner circumferential surface of the housing.

23. The device according to claim 22, wherein the flow path is formed to completely run around the valve body and has a constant width in the radial direction as well as a constant height in the direction of the longitudinal axis of the device along an entire circumference of the valve body.

24. The device according to claim 22, wherein the flow path is connected to a flow channel aligned in the radial direction, formed by a port element.

25. A device for regulating a flow and distributing a fluid in at least one fluid circuit, the device comprising a housing with port elements for connecting to fluid lines as well as at least two disc elements disposed within a volume enclosed by the housing and aligned in parallel to each other, each of the at least two disc elements is formed with at least one passage opening, wherein a respective flow channel formed by each of the port elements leads into the volume, wherein the at least two disc elements are disposed to be spaced apart from each other in a direction of a longitudinal axis of the device, wherein a valve body supported rotatably relative to the housing about a rotation axis aligned in the direction of the longitudinal axis is formed between the at least two disc elements, the valve body has at least one passage opening, wherein a respective one of the at least one passage opening of the at least two disc elements and the at least one passage opening of the valve body with an arrangement of the valve body relative to the at least two disc elements as well as to the housing are formed to control at least one flow area of a flow path through the housing with the port elements and through the at least two disc elements as well as the valve body, wherein the flow path causes an inflow and an outflow of the fluid in both a radial direction and an axial direction, wherein the at least two disc elements are each disposed to be sealed at end faces facing away from each other with at least one sealing element each facing towards the housing, wherein the at least two disc elements are each disposed to be biased in the direction of the longitudinal axis with the at least one sealing element facing towards the housing and the at least one sealing element has a linear spring characteristic.

26. A device for regulating a flow and distributing a fluid in at least one fluid circuit, the device comprising a housing with port elements for connecting to fluid lines as well as at least two disc elements disposed within a volume enclosed by the housing and aligned in parallel to each other, each of the at least two disc elements is formed with at least one passage opening, wherein a respective flow channel formed by each of the port elements leads into the volume, wherein the at least two disc elements are disposed to be spaced apart from each other in a direction of a longitudinal axis of the device, wherein a valve body supported rotatably relative to the housing about a rotation axis aligned in the direction of the longitudinal axis is formed between the at least two disc elements, the valve body has at least one passage opening, wherein a respective one of the at least one passage opening of the at least two disc elements and the at least one passage opening of the valve body with an arrangement of the valve body relative to the at least two disc elements as well as to the housing are formed to control at least one flow area of a flow path through the housing with the port elements and through the at least two disc elements as well as the valve body, wherein the flow path causes an inflow and an outflow of the fluid in both a radial direction and an axial direction, wherein at least one first passage opening of the valve body is formed to extend completely through the valve body from a first end face to a second end face and to be closed at a circumferential surface, wherein at least one second passage opening and/or one third passage opening of the valve body is/are formed to only lead into one end face of the valve body and to be open at the circumferential surface of the valve body.

27. A coolant circuit of a thermal management system of a motor vehicle for conditioning at least one mass air flow supplied to a passenger compartment as well as at least one component of a driveline, wherein the thermal management system has at least one refrigerant circuit and at least one coolant circuit for receiving heat from the refrigerant circuit, wherein the at least one coolant circuit comprises a device for regulating a flow and distributing a fluid in the at least one coolant circuit, the device comprising a housing with port elements for connecting to fluid lines as well as at least two disc elements disposed within a volume enclosed by the housing and aligned in parallel to each other, each of the at least two disc elements is formed with at least one passage opening, wherein a respective flow channel formed by each of the port elements leads into the volume, wherein the at least two disc elements are disposed to be spaced apart from each other in a direction of a longitudinal axis of the device, wherein a valve body supported rotatably relative to the housing about a rotation axis aligned in the direction of the longitudinal axis is formed between the at least two disc elements, the valve body has at least one passage opening, wherein a respective one of the at least one passage opening of the at least two disc elements and the at least one passage opening of the valve body with an arrangement of the valve body relative to the at least two disc elements as well as to the housing are formed to control at least one flow area of a flow path through the housing with the port elements and through the at least two disc elements as well as the valve body, wherein the flow path causes an inflow and an outflow of the fluid in both a radial direction and an axial direction.

* * * * *